United States Patent [19]
Billotte

[11] Patent Number: 5,490,755
[45] Date of Patent: Feb. 13, 1996

[54] SELF-PROPELLED LOADER CARRIER

[76] Inventor: Keith W. Billotte, 2213 Willow La., Clearfield, Pa. 16830

[21] Appl. No.: 271,377

[22] Filed: Jul. 6, 1994

[51] Int. Cl.$^6$ ..................................................... B60P 1/48
[52] U.S. Cl. .......................... 414/550; 414/555; 414/729; 414/739; 180/24.03
[58] Field of Search ..................................... 414/546, 547, 414/555, 550, 685, 690, 694, 729, 731, 739; 180/24.03, 24.07, 210

[56] References Cited

U.S. PATENT DOCUMENTS

| | | | |
|---|---|---|---|
| 3,567,051 | 3/1971 | Bell | 414/739 |
| 3,643,828 | 2/1972 | Elliott | 214/762 |
| 3,782,536 | 1/1974 | Toney | 198/233 |
| 3,800,966 | 4/1974 | Newton | 414/555 X |
| 4,085,853 | 4/1978 | van der Lely et al. | 414/555 X |
| 4,091,943 | 5/1978 | Bay-Schmith | 414/555 X |
| 4,184,425 | 1/1980 | Haney et al. | 180/24.07 X |
| 4,210,219 | 7/1980 | Oswald et al. | 414/739 X |
| 4,411,583 | 10/1983 | Petitto | 414/687 |
| 4,913,253 | 4/1990 | Bowling | 180/210 |
| 4,925,358 | 5/1990 | Cook | 414/685 |
| 4,968,211 | 11/1990 | Compton | 414/502 |
| 5,082,082 | 1/1992 | Hvolka | 180/234 |

Primary Examiner—Michael S. Huppert
Assistant Examiner—Stephen Gordon
Attorney, Agent, or Firm—Eckert Seamans Cherin & Mellott

[57] ABSTRACT

A self-propelled boom loader is arranged as a hybrid between a trailer and a self-propelled vehicle. The loader has a carriage with a pair of independently controllable drive wheels powered by hydraulic drive motors and a free turning third wheel caster spaced from the drive wheels in a tricycle configuration. A hydraulic loader such as a knuckle boom loader is carried on the carriage on a turntable mount. The loader has an on-board hydraulic pump providing operational hydraulic pressure to the boom and turntable, which pressure is controllably divertable to operate the drive motors via controls in the loader cab. The loader is adapted for maneuvering in close quarters and has stabilizing outriggers. The drive wheels have rotationally disengageable hubs for freewheeling, and the carriage has a tow hitch coupleable to a tow vehicle for trailering, the wheels and hitch being mounted on the carriage such that the third wheel is lifted from the ground during trailering, for over the road transport.

8 Claims, 9 Drawing Sheets

SELF-PROPELLED LOADER CARRIER

BACKGROUND OF THE INVENTION

1. Field of the Invention

The invention relates to a self-propelled loader especially adapted to working in confined spaces such as load transfer yards for logs, lumber and the like. In particular, the invention comprises a self-propelled knuckle boom loader having a tricycle wheel arrangement, with two drive wheels driven hydraulically from the hydraulic system of the loader, and a freewheeling third wheel forming a caster that is lifted from the ground when the loader is attached to a hitch-for trailering.

2. Description of the Prior Art

Turntable mounted hydraulic loaders are known in the art, including knuckle boom loaders having a grasping or other cargo-engaging mechanism at the end of an articulated boom. Loaders of this type conventionally are mounted on the platform of a truck, such as at an end or corner of a flatbed of a truck, where the loader can be used to move cargo on and off the truck bed. A larger form of loader or crane can occupy all the space on the truck bed, for use in moving cargo from one place to another on the ground, to move cargo between a truck or rail car and the ground, etc. It is also possible to provide a loader or crane on a trailer that can be towed by a tractor. Frequently, loaders as so mounted are provided with hydraulically operable outriggers that can be lowered to stabilize the loader and to prevent the vehicle from upsetting, should the loader engage a substantial weight at a point cantilevered from the truck or trailer.

One drawback of these arrangements is that if the loader is to be used at different locations, the truck or tractor is practically dedicated to use with the loader. In conjunction with yard work, it is important that the loader be transportable from place to place, often frequently, to reach and move items. Where the loader is mounted on and/or movable only by a truck, the engine, cab accoutrements, controls, and supporting structure of the truck are needed. It is possible to have one worker operate the loader and another to drive the truck. To a large extent, these elements and workers are duplicated on the truck and on the loader, which is redundant and wastes money.

Typically, the operator of a truck mounted loader is also the operator of the truck. However, to relocate the loader the operator must leave the controls of the loader, move to the cab of the truck, drive the truck to the new location and then return to the controls of the loader, which wastes time.

Arrangements involving a loader on a truck are clumsy to use in narrow operating areas, such as, for example, between piles of logs in lumber yards. Trucks or tractortrailer arrangements necessarily have a relatively long turning radius, and to use a loader on a truck it is necessary to leave sufficient space in the yard to maneuver the truck, which wastes space. In addition, the position of the truck or trailer cab can prevent the knuckle boom from having a full 360° operating range of motion. This operational limitation necessitates more frequent moving of the entire arrangement to reach items forward of the truck cab.

A smaller, more easily maneuverable hydraulic loader system would permit more efficient use of storage space, for example in lumber yards, where large objects must be moved from place to place. Self-propelled cranes and the like of course are well known, and typically have wheels or tracks. However, conventional self-propelled devices of this type are not readily transported over the road. The ground-engaging propulsion mechanisms (e.g., hydraulically driven wheels or tracks) are designed for slow movement over rough terrain, steep slopes, etc., rather than for highway use. Adapting such mechanisms for highway use would detract from their effectiveness off the road.

It would be advantageous if the conflicting needs associated with operation as a loader, and with transportation (both on and off the road) could be resolved in an optimal manner. There is a need for an easily maneuverable, hydraulic loader that does not require a dedicated truck or tractor and can be controlled directly from the loader controls, which is readily transportable both in a highly maneuverable manner over rough terrain and between obstacles as typical of a yard, and which is also optimized for transport over the road.

SUMMARY OF THE INVENTION

It is an object of the invention to provide a hydraulic loader that is highly maneuverable for work over rough terrain and among obstacles.

It is another object of the invention to provide a self-propelled loader that does not need a dedicated truck or tractor-trailer arrangement for maneuvering during use as a loader, and which uses the hydraulic system and cab controls of the loader for motive power, steering and braking.

It is another object of the invention to provide a self-propelled loader that is trailerable, by disengagement of its drive mechanisms, for transport over the road.

It is another object of the invention to provide a self-propelled knuckle boom loader that is operationally stable and has nearly a 360° range of operation, and that preferably is movable continuously around a 360° range of rotation.

It is yet another object of the invention to provide a hydraulic loader that enables more efficient use of storage space at a work site for the loader.

These and other needs are met according to the invention in a self-propelled loader based on a tricycle arrangement of two hydraulically driven drive wheels and a free wheeling caster mounted on an elongated carriage, forming a trailer engageable by a trailer hitch such as a kingpin hitch. The carriage supports a hydraulic loader that is rotatable on a vertical axis adjacent an end remote from the trailer hitch. The carriage drive wheels are independently controllable via a pair of hydraulic drive motors coupled to a proportionate valving arrangement operated from the loader control station (e.g., cab), which together with the freewheeling caster spaced from the drive wheels, provides a short turning radius appropriate for yard work. The hydraulic loader is preferably a knuckle boom loader on a turntable mount, and has an on-board hydraulic pump for providing hydraulic pressure to each of the drive motors, to the hydraulic loader turntable mechanism, to the cylinders used to extend and retract the boom and the grasping means (if any), and can also include a plurality of hydraulically movable outriggers for stabilizing the loader during loading operations. While the carriage is especially useful with a rotatable hydraulic loader having an extensible boom, the invention is not limited to that use, but is also intended to be used with any type of hydraulic equipment normally mounted on a flat-bed truck or other movable platform.

According to another aspect of the invention, the carriage is steered by providing proportionate power to the drive wheels for independently rotating the wheels forward or backward. This enables the carriage to have a zero turning circle within its own wheelbase, namely by turning one wheel forward and the other backward. The proportionate control permits any combination of forward and rearward turning motions as well as straight line driving, and advantageously is controlled manually by the operator using a joystick, steer-and-throttle control or dual wheel control levers.

According to another aspect of the invention, the carriage advantageously includes a towing arrangement at an end distal from the drive wheels for removable coupling to a tow vehicle for trailering the loader. The drive wheels can include hubs that are disengageable from the drive motors, whereby the drive wheels can freewheel during trailering. The drive wheels can further include brakes operable from the tow vehicle or actuated by pressure on the hitch during braking of the tow vehicle, e.g., the tractor part of a semi-trailer to which the loader is engaged by a kingpin.

These and other objects of the present invention will be more fully understood from the following detailed description of the invention with reference to exemplary embodiments as illustrated in the drawings appended hereto.

DETAILED DESCRIPTION OF THE PREFERRED EMBODIMENTS

Figure 1:
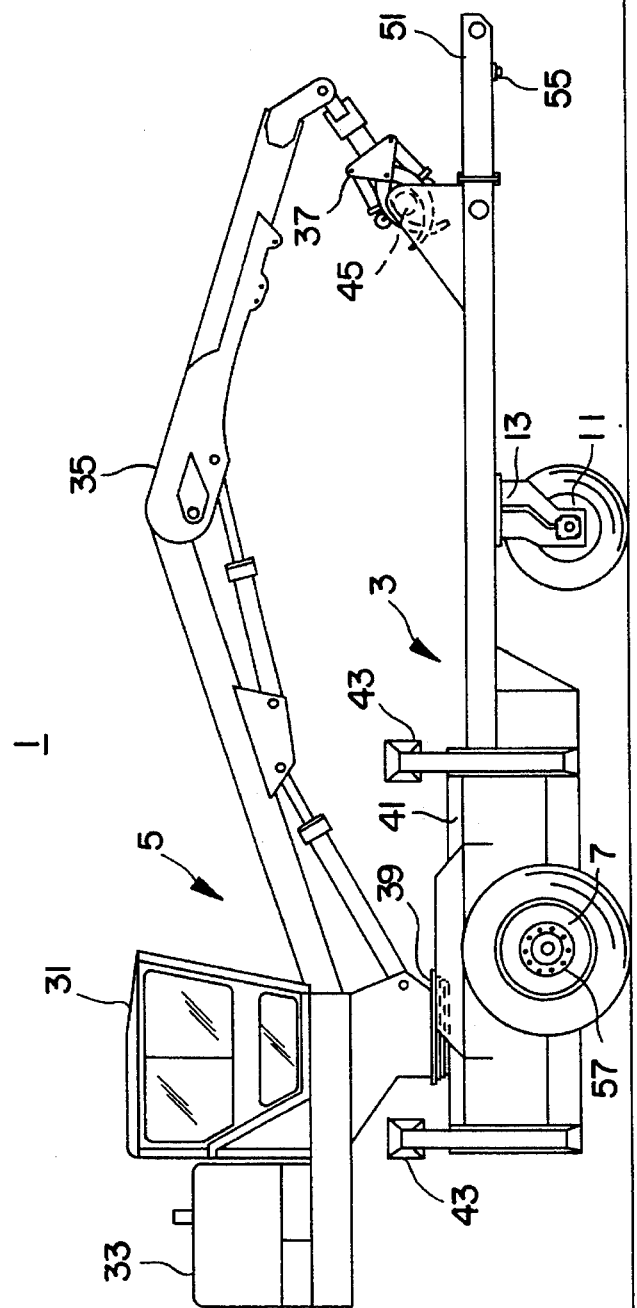
FIG. 1 is a side elevational view of a preferred embodiment of a self-propelled loader of the invention, configured as a knuckle boom loader.

A self-propelled loader according to the invention is illustrated in FIGS. 1–10. Loader 1 includes a carriage 3 supporting a hydraulic loader 5, which can rotate on a turntable on the carriage and has a cab and engine compartment providing power and control for use in loading functions and for self propulsion. The carriage 3, viewed in isolation in FIG. 2, includes a pair of coaxial drive wheels 7, 9 adjacent a rear end and a free-turning nose wheel or caster 11 mounted on caster support 13, also shown in FIGS. 3 and 4, that permits free rotation on a vertical axis spaced from the drive wheels 7, 9.

Figure 3:
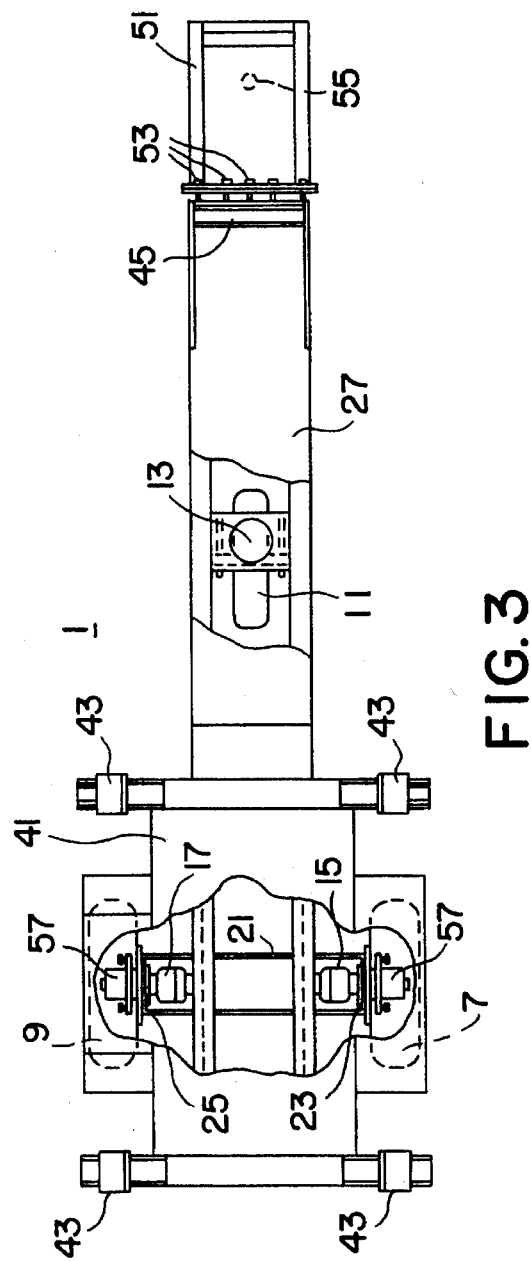
FIG. 3 is a partly cut-away top plan view of the carriage shown in FIG. 1, showing the wheel and drive arrangements with the third wheel caster positioned for forward/rearward movement.
Figure 4:
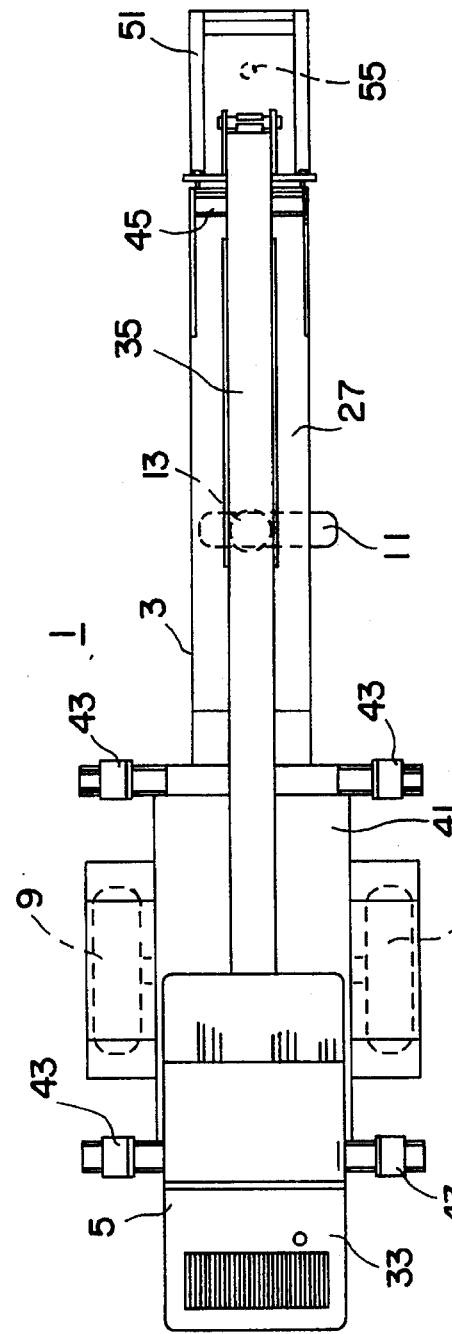
FIG. 4 is a top plan view of the self-propelled loader of FIG. 1, with the third wheel caster positioned for turning at the minimum turning radius.
Figure 6:
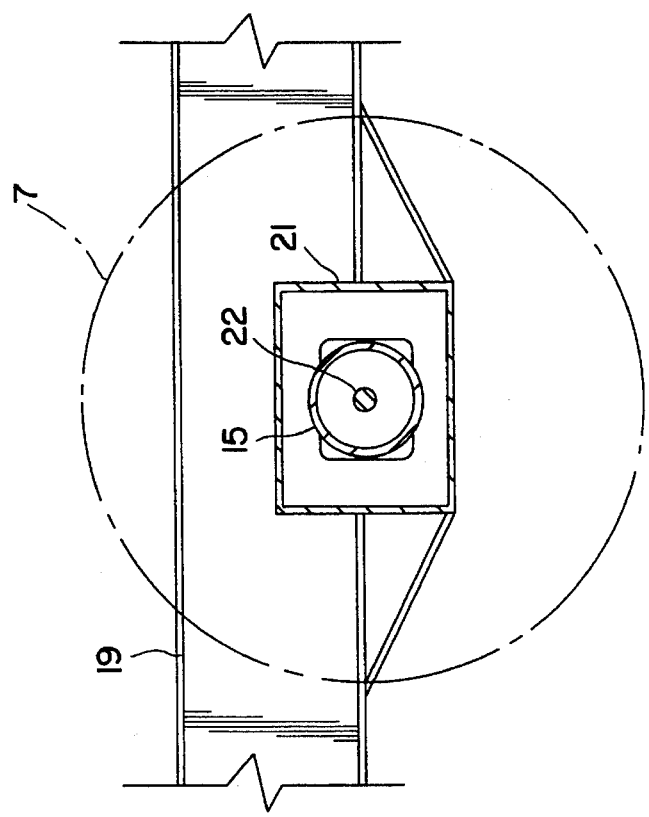
FIG. 6 is a detail side elevation view of a drive wheel mounting arrangement.
Figure 5:
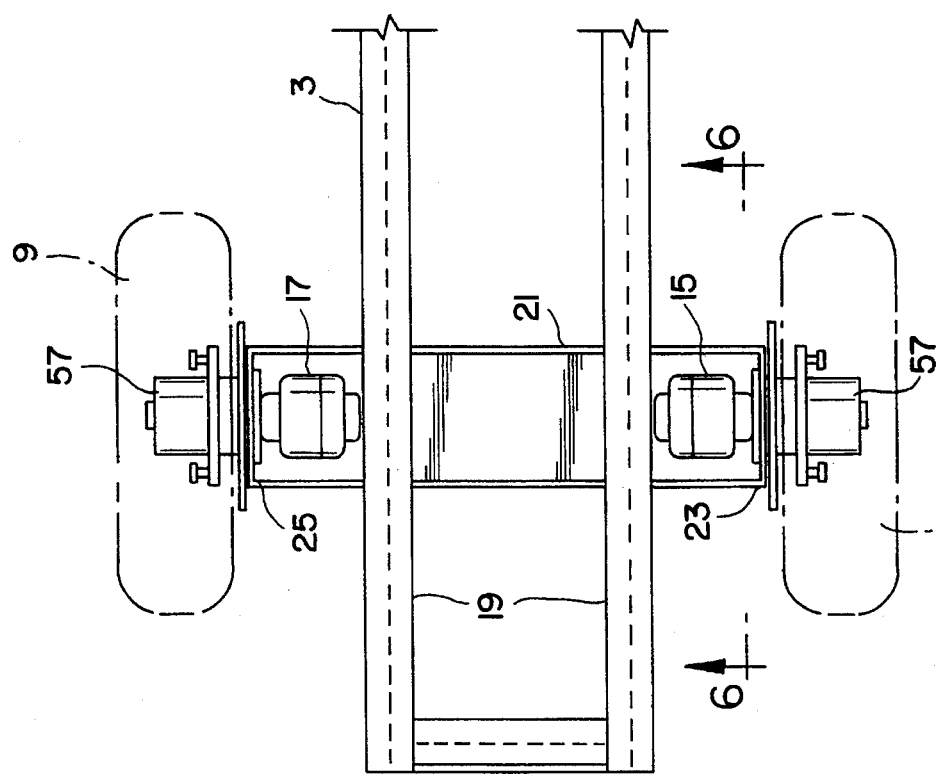
FIG. 5 is a detail plan view showing an arrangement of the drive wheels and drive motors.

Drive wheels 7 and 9 are powered independently by a pair of hydraulic motors 15 and 17, respectively, shown in FIGS. 3 and 5. Motors 15, 17 are preferably hydraulic vane motors equivalent to Hägglunds Denison motors models M4E or M4E1 or the like.

The carriage defines a bed for supporting the loader, a chassis whereby the loader is carried on wheels, and means defining a towable trailer. In the preferred embodiment illustrated in the drawings, the bed has an I-beam construction, including a pair of laterally spaced parallel I-beam supports 19 extending longitudinally (i.e., transverse to the axis of the drive wheels 7 and 9). The I-beam supports 19 are carried by a box-like structure that encloses the sides and bottoms of the hydraulic motors 15 and 17, mounted therein. The drive axles 22 between the hydraulic motors and the drive wheels extend through the end walls 23 and 25 of the box-like structure 21. The rotatable caster 13 is attached to the bottom of a tongue 27 extending forward from the support bed.

The loader 5 is supported on the I-beam supports 19, and includes a base means 41 rigidly attached to supports 19 and means for powering and positioning the boom and grasping means under operator control. Loader 5 is preferably a knuckle boom loader, such as a Prentice T180D, T210D or a T410D knuckle boom loader. Knuckle boom loaders are known per se in the art, and will not be described in detail herein. The loader can be attached to the carriage by, for example, removable fasteners, such as bolts, or can be permanently attached to the carriage, for example, by rivets or by welds.

Loader 5 includes a cab 31 for the operator, an engine 33 for powering a hydraulic system (see FIG. 11), an extensible, articulated hydraulic boom 35, grasping means 37 at a free end of the boom 35, and a turntable mount 39 upon which the cab 31 engine 33 and boom 35 can rotate through 360°. The turntable mount 39 is attached to support frame 41, which is directly attached to bed 18, including the I-beam supports 19. Two or four moveable outriggers 43 are mounted on frame 41 for providing additional support and stabilization to the self-propelled loader 1 during operation of the boom 35. The outriggers 43 can be hydraulically controlled by the hydraulic system of the loader 5.

The top side of the tongue 27 includes a grapple mount 45 whereby the boom can be held at a fixed position, by grasping the grapple mount 45 with the grasping means 37. This feature is especially useful when the self-propelled loader 1 is being transported from one location to another, either in a self-propelled manner or by trailering.

The self-propelled loader 1 can be adapted for towing by another vehicle. While towing is not necessary for moving the self-propelled loader between nearby locations at a yard or other work site, it is the most efficient manner for moving the loader 1 over longer distances over public roads and highways. For this purpose a tow hitch 51 is mounted at the end of the tongue remote from the drive wheels 7 and 9 and proximate the third wheel 11. The tow hitch 51 can be permanently attached, for example, by rivets or welds, or removably attached by fasteners 53 such as, for example, bolts and nuts. The tow hitch in the exemplary embodiment includes a king pin arrangement 55.

A hub lockout mechanism 57 is included in each of the drive wheels 7 and 9 to enable the drive wheels to turn freely during towing. Hub lockout mechanisms are known in the art, for example as embodied by the Fairfield torque hub, and according to the invention are provided to selectively release the rotational connection between the wheels and their hydraulic motors, while retaining the journalled mounting of the axles to the frame for structural support of the loader. Drive wheels 7, 9 preferably also include brakes operable by pneumatic, hydraulic or mechanical means from a tow vehicle 63 for use during towing. The brakes preferably are pneumatic disc brakes operable over a removable coupling to the tow vehicle 63. Alternatively, the brakes can be operated via a self-contained hydraulic or pneumatic system involving a cylinder that is compressed by pressure on the hitch when the tow vehicle is braking.

Figure 7:
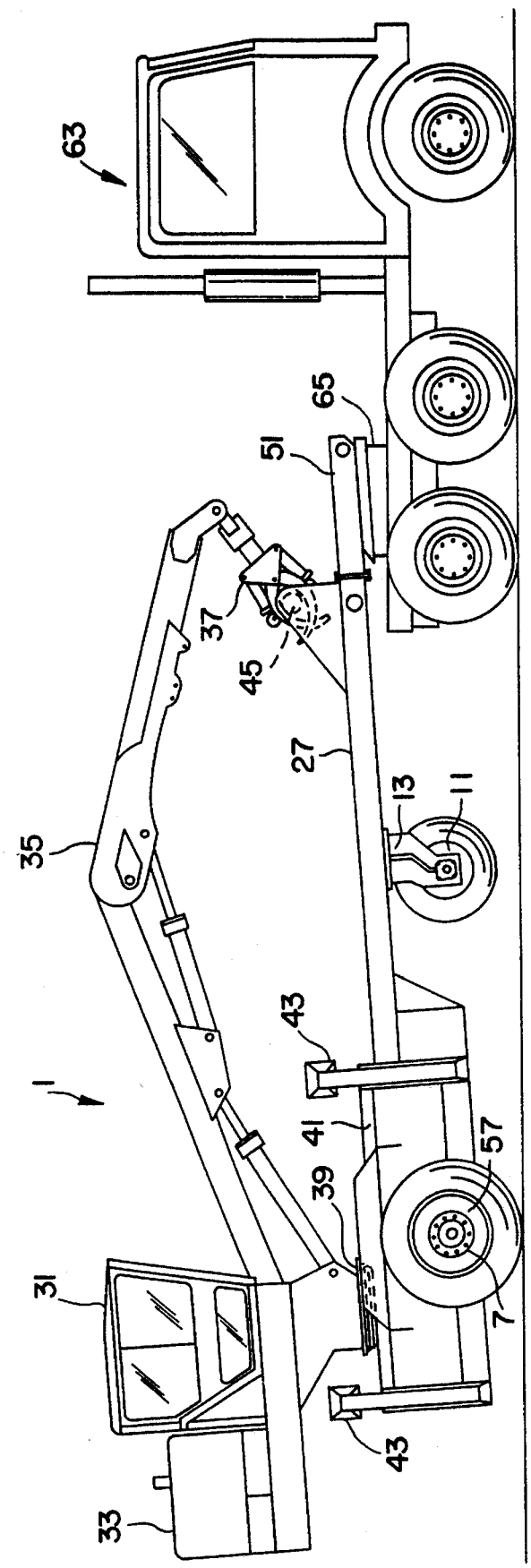
FIG. 7 is a side elevational view of the loader of FIG. 1 in a trailering arrangement.

FIG. 7 shows the self-propelled loader 1 rigged for trailering by the tow vehicle 63. The tow hitch 51 is connected to a mating tow hitch 65 on the tow vehicle 63. The hub lock-out mechanism 57 has been adjusted to disengage the drive wheels 7, 9 from the hydraulic motors such that they free-wheel. The front end of the carriage, including the tongue 27, is supported by the mating tow hitch 65. The tongue 27 and wheels 7, 9, 11 are mounted on the loader such that when the hitch is affixed to a standard size tow vehicle the nose wheel is lifted off the ground, for example clearing the road by 15–25 cm during trailering. Boom 35 is secured in a lowered, forward position by grasping the grapple 45 with the grasping means 37, and outriggers 43 are lifted to their full in-board position alongside the carriage. Pneumatic connections for disc brakes 61 and electric connections for tail lights (not shown) on the carriage are made with the tow vehicle in known manner.

Although the carriage advantageously includes the tow hitch 51, the hitch is not used during normal operation at a single work site, such as at a lumber yard. The carriage is shorter and therefore can turn in a smaller span without tow hitch 51. It is possible to make the tow hitch detachable at some point forward of third wheel 11 by bolts or other means (not shown). However, for most applications, it is sufficient to have the tow hitch 51 attached permanently.

Figure 11:
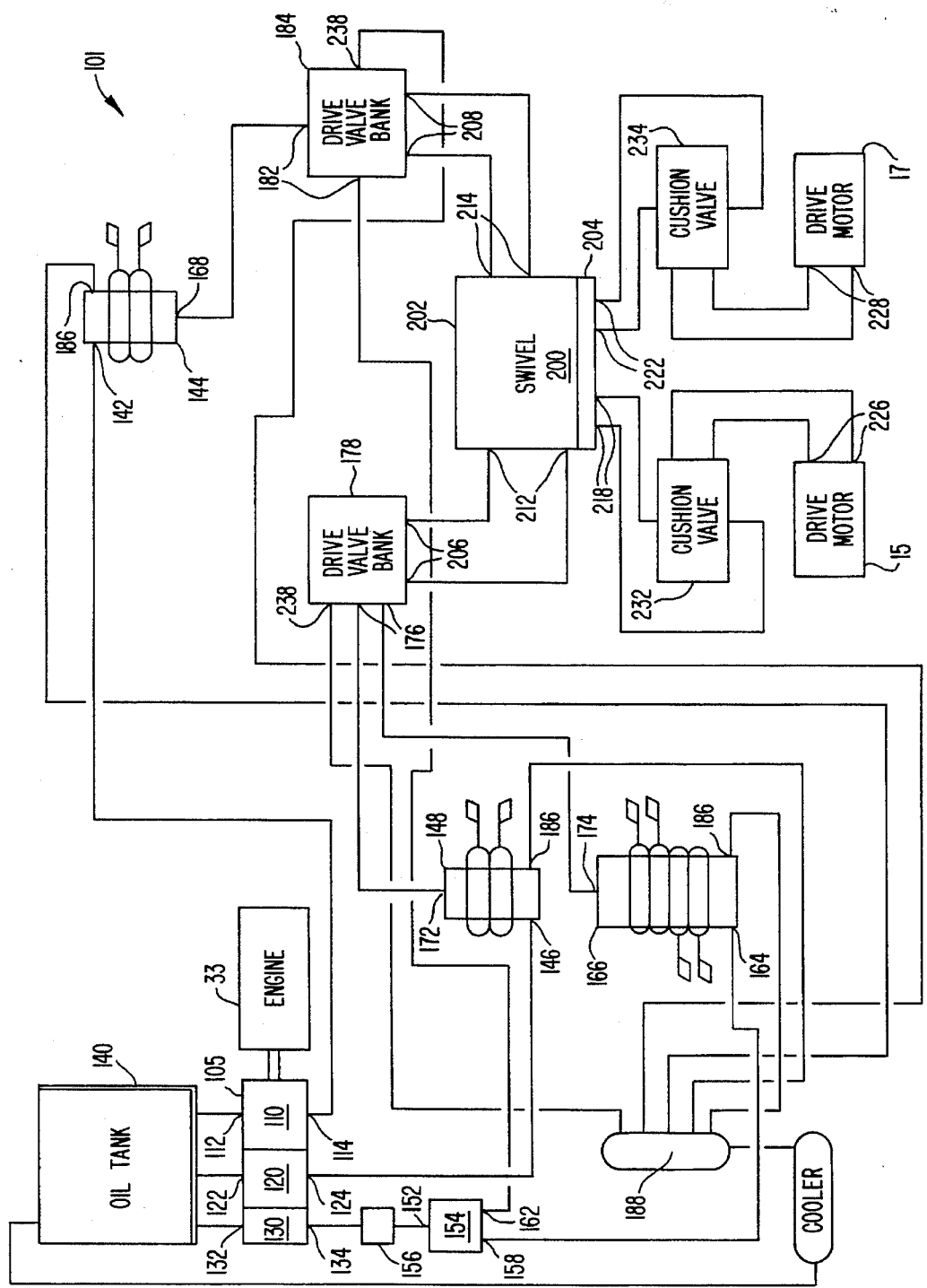
FIG. 11 is a schematic of a hydraulic power arrangement for use with the loader of FIG. 1.

FIG. 11 schematically illustrates an embodiment of a hydraulic system 101 for the self-propelled loader 1. Hydraulic system 101 includes additions to the hydraulics conventionally provided in typical knuckle boom loaders like loader 5. But according to the invention, the hydraulic system 101 is configured with such additional components that operate and control the drive wheels 7 and 9 (FIGURE) for self-propulsion under control of an operator in the cab 31.

The hydraulic system 101 includes a three-section hydraulic pump 105, powered by engine 33, to supply pressurized hydraulic oil through oil through the lines and components as generally described next. The pump 105 includes first and second sections 110 and 120 which each supply about 44 gallons per minute ("gpm") of oil (170 liters per minute of "lpm"), and a third section 130 which supplies about 22 gpm (85 lpm). Each pump section 110, 120 and 130 has an intake port 112, 122 and 132, respectively, fed oil from a common oil tank 140. Each pump section 110, 120 and 130 likewise has a respective output port 114, 124 and 134, respectively.

The output port 114 of the first pump section 110 is connected to an inlet port 142 of a right joy stick 144 (right relative to the operator in the cab), while the output port 124 of the second pump section 120 is connected to an inlet port 146 of a left joy stick 148. Each joy stick 144 and 148 includes a pair of levers, and each of the pair of levers rotates a spool, which spools respectively throttle the flow of oil that powers one or another of the hydraulic components of the loader 5 (but not the carrier 3). These components of the loader 5 include, namely, the main boom, the stick boom, the grapple rotation, and the grapple pinching, all of which are known in typical loaders and which form no part of the invention. Accordingly, the joy sticks 144 and 148 are illustrated but not the components of the loader 5 to which they are also connected.

Figure 8:
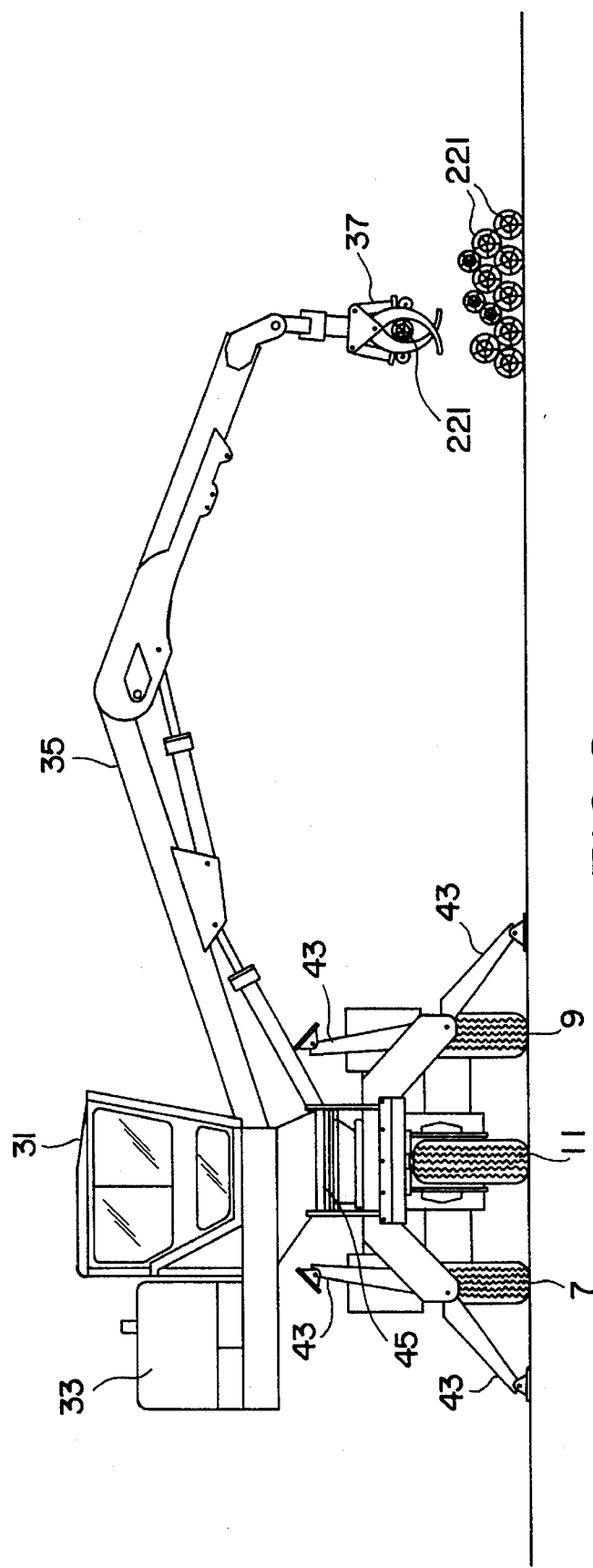
FIGS. 8 and 9 illustrate the knuckle boom loader of FIG. 1 in two different positions during use in loading functions.

The output port 134 of the third pump section 130 is connected to an inlet port 152 in a flow divider 154 (with a pilot pressure valve 156, described later, interconnected therebetween). The flow divider 154 divides the flow of oil between first and second outlet ports 158 and 162, the first of which is connected to an inlet port 164 in an outrigger control valve 166. The outrigger control valve 166 has four levers, each rotating a spool that respectively meters the flow of oil that powers a respective one of the four outriggers 43 (FIG. 8). The outriggers 43 and the outrigger control valve 166 are typical components of a loader 5, and while the outrigger control valves 166 are illustrated in FIG. 11, the outriggers 43 are not. Moreover, there are further valves and components of the loader 5 which are not illustrated in FIG. 11, such as those associated with powering the turntable, but which are within the teachings of the present invention.

Each one of the right and left joy sticks 144 and 148, as well as the outrigger control valve 166, respectively, includes a port that is known in the art as a "pressure beyond" port. Essentially, these ports 168, 172 and 174 permit the unobstructed throughput of oil for other uses. Thus, the "pressure beyond" ports 172 and 174 of the left joy stick 148 and the outrigger control valve 166 are connected to a pair of inlet ports 176 in a first drive valve 178. Similarly, the "pressure beyond" port 168 of the right joy stick 144 as well the second outlet port 162 of the flow divider 154 are connected to a pair of inlet ports 182 in a Second drive valve 184. The outrigger valve 166 and the two joystick valves 144 and 148 also have exhaust ports 168 that are connected to a manifold 188 which returns oil to the oil tank 140 via an oil cooler.

Figure 2:
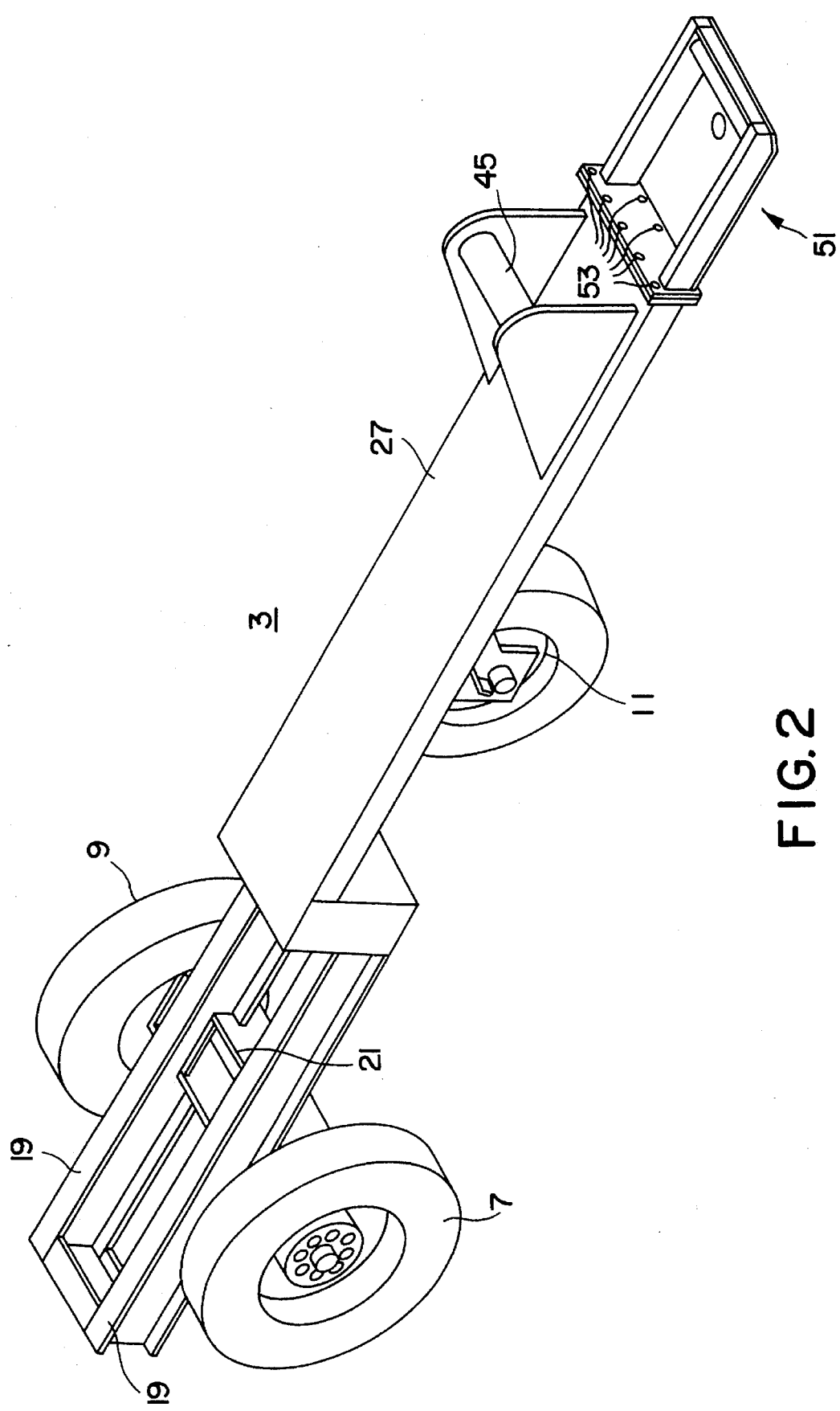
FIG. 2 is a perspective view of a carriage for supporting the loader.

Each drive valve 178 and 184 has levers in the cab for metering the flow of oil to a respective drive motor 15 or 17 on one or the other of the wheels 7 or 9 (FIG. 2). During demanding uses of either drive motor 15 or 17, that drive motor 15, 17 may consume around 50 gpm (190 lpm) of oil. No one of the three pump sections 110, 120 or 130 can operate to meet that kind of oil consumption. Therefore, each drive motor 15, 17 is powered in accordance with the following arrangement of oil supply, namely by one-half of the flow of the 22 gpm (85 lpm) third section 130 in addition to all of the flow of one of the two 44 gpm (170 lpm) sections 110 or 120. Thus, the oil consumption needs of each drive motor 15 and 17 is correspondingly met by this combination and/or arrangement of the flow of the three pump sections 110, 120, and/or 130.

The drive valves 178 and 184, as mounted in the cab of the loader 5, communicate with the drive motors 15 and 17 on the carrier 3 via a swivel 200. This swivel 200 includes an upper and lower turntable part 202 and 204 respectively, that are rotatably coupled for swivelling relative to each other about a vertical swivel axis. The swivel 200 features such an upper and lower part 202 and 204, the upper part 202 has a set of fourteen ports (e.g., 212 & 214) that can communicate pressurized hydraulic oil with the corresponding set of fourteen matching ports in the lower part 204. Moreover, the sets of ports 212 and 214, 218 and 220 can communicate across the upper and lower parts 202 and 204 even during relative changes in positions in the upper and lower parts 202 and 204.

FIG. 11 depicts just four of the ports in each of the upper and lower part 202 and 204. Each drive valve 178 and 184 has a pair of drive ports 206 and 208, respectively, connected to a pair of ports 212 and 214, respectively, in the upper part 202 which, via the corresponding pair of ports 218 and 222 respectively, in the lower part 204, are connected to a pair of ports 226 and 228, respectively, in a respective one of the drive motors 15 and 17 (with a cushion valve 232 or 234 interconnected therebetween). Each drive valve 178 and 184 also has an exhaust port 238 connected to the manifold 188. The pilot pressure valve 156 is connected to a fifth port (not shown) in the swivel 200 for actuating a parking brake (not shown) on the wheels 7 an 9. The pilot pressure valve 156 includes a "pressure beyond" port which is connected to the inlet port 152 in the flow divider 154.

In use, the drive valves 178 and 184 provide proportionate power-control over the drive motors 15 and 17, and thereby the drive wheels 7 and 9. To do this, the drive valves 178 and 184 preferably permit adjustment of oil pressure to the drive motors 15 and 17, individually, through an adjustable range between full forward and full reverse. Other types of control besides proportionate control are also possible, such as a throttle and steering wheel arrangement and the like.

The self-propelled loader 1 of the invention is operable by a single worker. When the self-propelled loader 1 is moved under its own power, the boom 35 is normally aligned (e.g., FIGS. 1, 3 and 10) with the tongue 27 above the nose wheel 11 and is held at that position by grasping the grapple mount 45 with the grasping means 37, and the outriggers 43 are raised for clearance. That is, the operator returns the boom to a front-facing position to move about under self-propulsion. However, this is not strictly necessary, and the operator can also move under self-propulsion when the boom is in other orientations, with due regard for stability during turns and the like.

The application of hydraulic pressure to the drive wheels 7 and 9 as opposed to the extensible cylinders and the like of the loader 5, can be made selectable by selector valves (not shown), but preferably hydraulic pressure remains available to the drive valves 178 and 184 via the "pressure beyond" ports 174, 168 and 172 in the outrigger valve 166 and joy sticks 144 and 148 while the loader is in use (e.g., for moving while positioning the boom simultaneously).

Inasmuch as the drive motors 15 and 17 can be operated in forward or reverse and at any point in the available range of speed depending upon the hydraulic pressure provided to each of the drive motors 15 and 17, loader 1 can move forward and backward, execute forward or backward turns, and even turn in place. The speed of rotation of the drive motors 15 and 17 depends on the differential pressure across the ports 226 or 228 in the drive motors 15 and 17; the direction of rotation is changed by reversing which of the two ports 226, 228 in the drive motor 15 or 17 is supplied pressurized oil. The two drive motors 15 and 17 are operative independently of each other. In other words, the direction, and/or the speed, of rotation of each drive wheel, is individually controllable.

Figure 10:
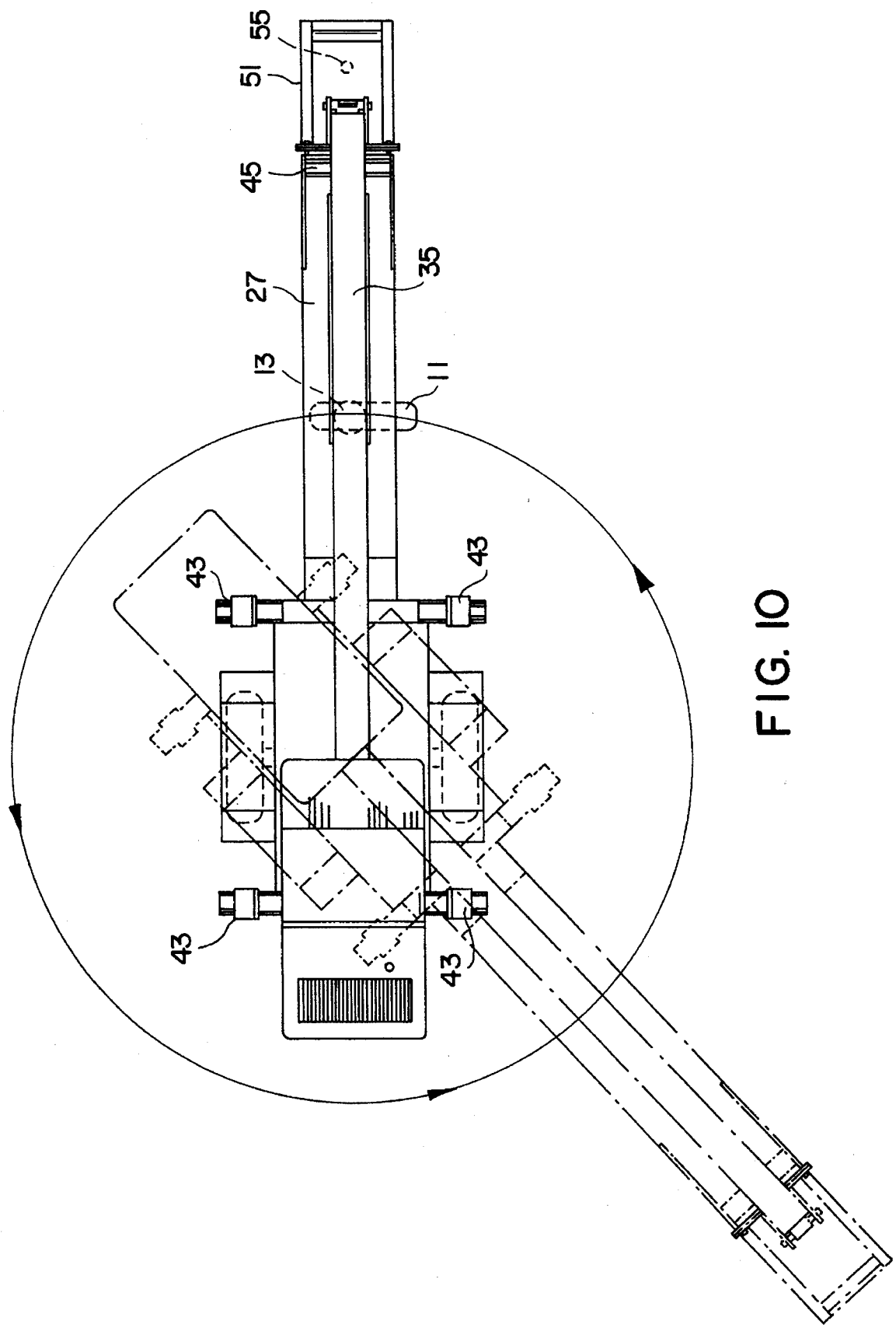
FIG. 10 is a top plan view of the loader of FIG. 1 showing the knuckle boom at two rotational positions within a turning circle, one of the positions being shown in broken lines.

Consequently, the self-propelled loader 1 can be turned in accordance with various maneuvers. For instance, the loader 1 can be turned by making one drive wheel rotate faster than the other, in either a forward or reverse direction. It is noted that the third wheel 11 does not impede the turns of the carrier 3, as the third wheel 11 is mounted on a caster, and hence aligns freely with whatever turn the drive wheels execute. Another maneuver for turning the loader 1 includes, as shown by FIG. 10 shows, a turn in which the loader 1 pivots about a vertical axis through the center between its drive wheels 7 and 9. Put differently, the loader 1 has a turning circle (i.e., a "zero" turning circle) defined by its own wheel base when the drive wheels 7 and 9 are rotated at the same speed and in opposite directions.

Figure 9:
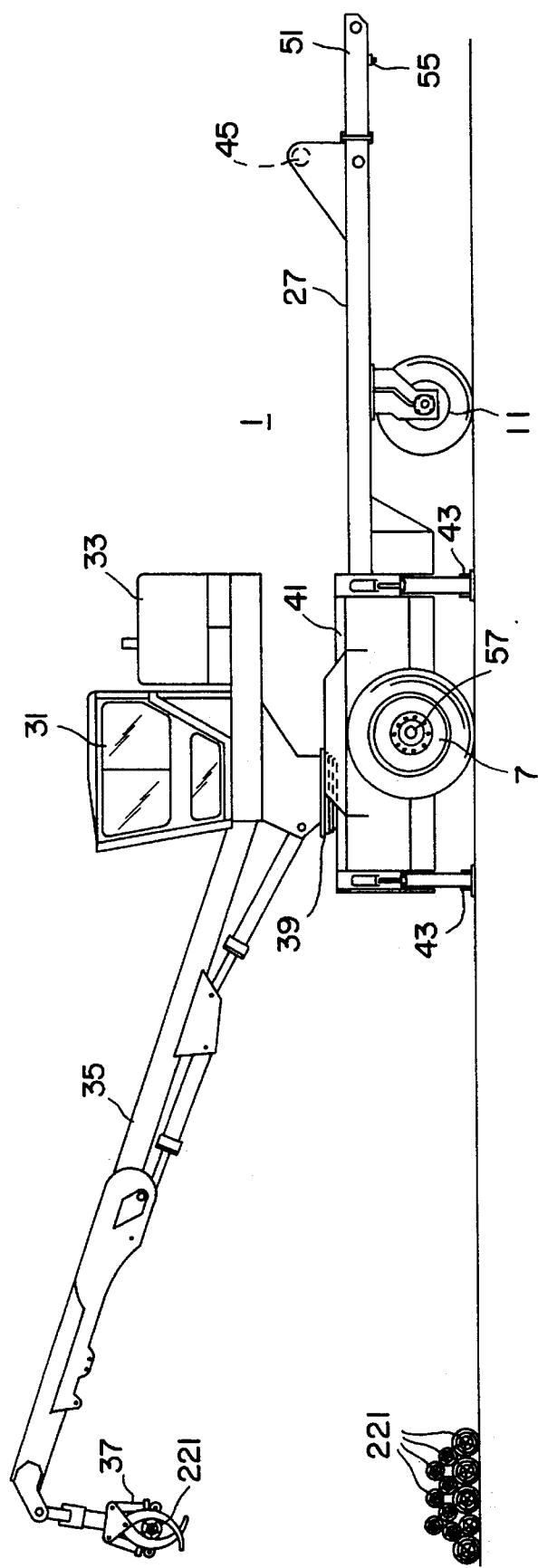

When the carriage 3 is positioned at a fixed location for moving large objects, such as logs 221 (see FIG. 8 and 9), the hydraulic power is used for conventional loader functions. Outriggers 43 can be lowered to stabilize the carriage 3 for manipulating loads at a distance from the carriage. Grasping means 37 is opened to release grapple 45, and boom 35 can be moved to a desired angular position and extension such as to the side (FIG. 8) or to the rear (FIG. 9). Boom 35 preferably has a continuous operational range around 360° and can rotate continuously if needed. Access to loads on the ground is restricted only at the dead-forward position due to tongue 27. The loader 5 is operated according to normal practice.

Before again moving loader 1, the outriggers 43 are raised, and power is applied to the drive wheels. The self-propelled loader 1 can move to another position while carrying an object with the grasping means 37, taking care that the self-propelled loader 1 is balanced while moving, or boom 35 can be stowed again in the forward position while moving about. In any case, the self-propelled loader is easily operated and repositioned by a single operator in the cab 31.

While the preferred embodiments described herein refer to a hydraulic knuckle boom loader 5, rotatably supported on bed 18 of the carriage 3, the invention is not limited to loaders of this type, but also encompasses other types of hydraulic equipment such as extensible cranes and the like, that can be mounted on the carriage 3 and that provide controllable hydraulic pressure for operation of the drive motors 15, 17. The invention is particularly suited for use with turntable mounted, rotatable, hydraulic equipment such as boom devices, cherry pickers, diggers, loaders, cranes and the like.

Whereas particular embodiments of the present invention have been described above as examples, it will be appreciated that variations of the details may be made without departing from the invention. Therefore, reference should be made to the appended claims rather than to the foregoing discussion of preferred examples, in order to assess the scope of the invention in which exclusive rights are claimed.

I claim:

1. Self-propelled loading apparatus comprising:

a carriage, including first and second drive wheels independently powered by first and second hydraulic drive motors, respectively;

a turntable mount, affixed to the carriage;

a hydraulic knuckle boom loader supported on the carriage by the turntable mount, including a hydraulic pump for providing hydraulic power, rotation means for rotating the knuckle boom loader on the turntable mount, control means for selectively controlling application of hydraulic power to the rotation means, the knuckle boom loader and each of the first and second drive motors such that the apparatus is maneuverable;

wherein the first and second drive wheels have a common axis and wherein the carriage includes a free-turning nose wheel mounted on a pivotable caster spaced from the common axis;

wherein the carriage includes tow means for removably connecting the carriage to fi mating tow hitch on a tow vehicle, whereby the carriage can be trailered by the tow vehicle; and, wherein the hydraulic knuckle boom loader comprises grasping means at a free end.

2. Self-propelled loading apparatus of claim 1, further comprising a grapple mount disposed on the carriage, for grasping with the grasping means whereby the knuckle boom loader is maintained at a fixed position after engaging the grasping means to the grapple mount.

3. Self-propelled loading apparatus of claim 1, further comprising a plurality of movable outrigger means on the carriage, for stabilizing the self propelled loading apparatus during operation of the hydraulic knuckle boom loader.

4. Self-propelled loading apparatus of claim 1, wherein the tow means includes a king-pin arrangement at an end of the carriage proximate the nose wheel.

5. Self-propelled loading apparatus of claim 1, wherein the first and second drive wheels each includes hub lock means for selectively disengaging the drive wheels from the first and second drive motors respectively, whereby each of the first and second drive wheels can freewheel when the carriage is trailered.

6. Self-propelled loading apparatus of claim 5, wherein each of the first and second drive wheels includes brake means operable from the tow vehicle for braking when the carriage is trailered.

7. A self-propelled loading apparatus, comprising:

a carriage, including independently controllable first and second drive wheels having a common axis, first and second hydraulic drive motors for independently powering the first and second drive wheels, respectively, and a free-turning nose wheel mounted on a pivotable caster spaced from a common axis;

a turntable mount, affixed to the carriage;

a rotatable, hydraulic knuckle boom loader supported by the carriage on the turntable mount, including hydraulic power means for supplying hydraulic power, rotation means for rotating the knuckle boom loader on the turntable mount, a plurality of movable outrigger means for stabilizing the carriage during operation of the loader, an extensible hydraulic boom having grasping means at a free end, and hydraulic control means connected to the hydraulic power means for selectably directing hydraulic power to each of the first and second drive motors and to the boom;

a towing arrangement, including a tow hitch at an end of the carriage distal from the drive wheels for removably connecting the carriage to a mating tow hitch on a tow vehicle, hub lock means on each of the first and second drive wheels for reconnectably disengaging the first and second drive wheels from the first and second drive motors respectively, whereby each of the first and second drive wheels can freewheel when the carriage is trailered by the tow vehicle, and brake means operable from the tow vehicle for braking the carriage when the carriage is trailered by the tow vehicle; and a grapple mount on the carriage for grasping with the grasping means whereby the boom can be maintained at a fixed position.

8. Apparatus of claim 7, wherein the control means includes means for proportionately powering the first and second drive wheels individually to any point between full forward and full reverse rotation.

* * * * *